March 18, 1958    W. G. BARTENFELD    2,827,180
UNIVERSAL UNLOADING UNIT FOR BULK CARGO VESSELS
Filed Dec. 19, 1955    4 Sheets-Sheet 1
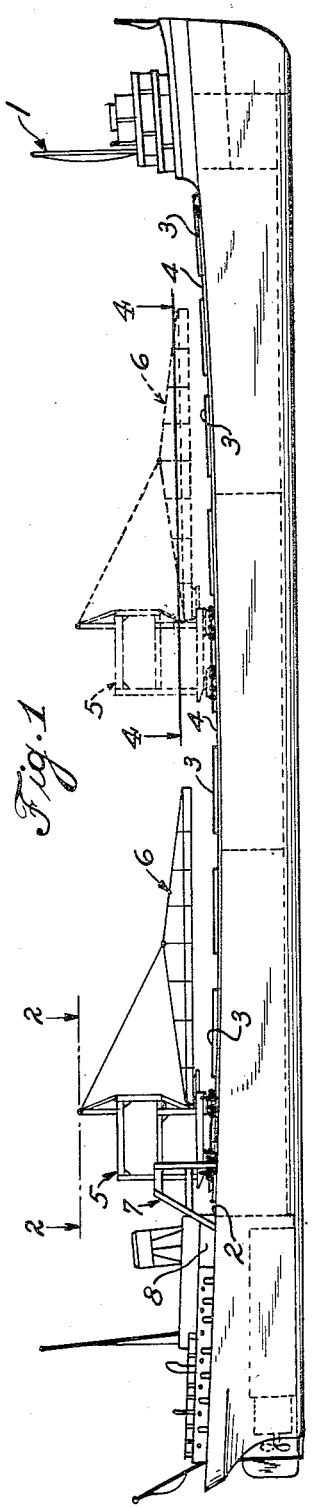
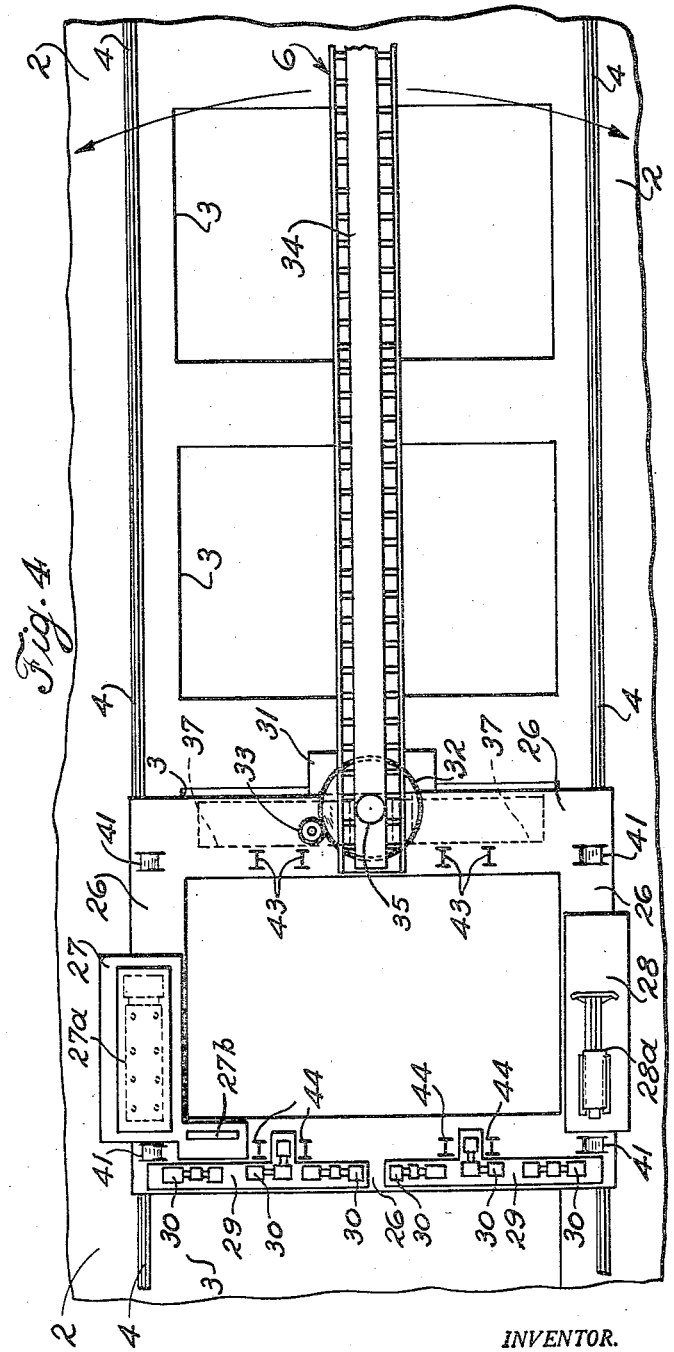
INVENTOR.
WILFORD G. BARTENFELD
BY Bosworth, Sessions,
Herrstrom & Lawler
ATTORNEYS March 18, 1958 W. G. BARTENFELD 2,827,180
UNIVERSAL UNLOADING UNIT FOR BULK CARGO VESSELS
Filed Dec. 19, 1955 4 Sheets-Sheet 2
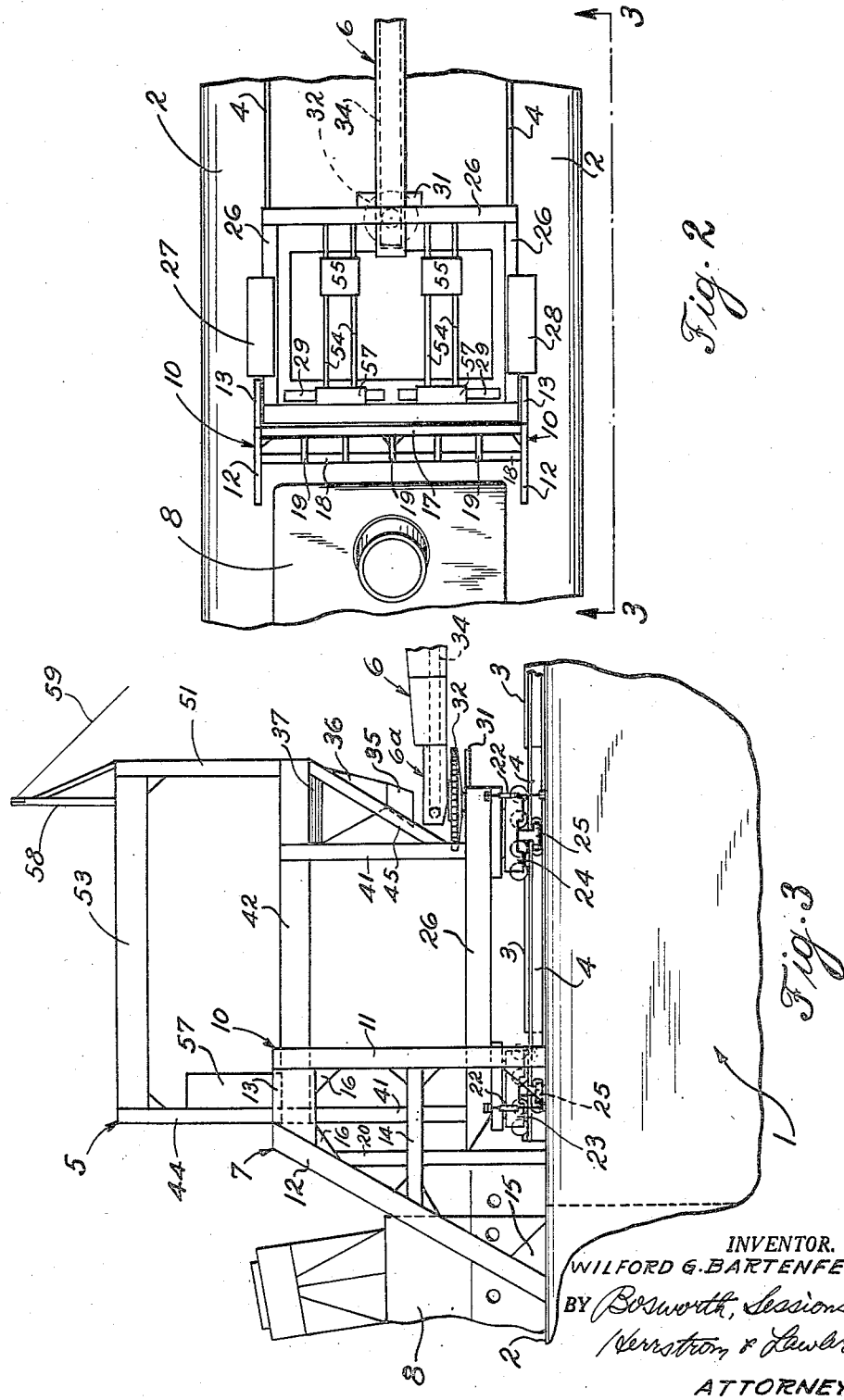
INVENTOR.
WILFORD G. BARTENFELD
BY Bosworth, Sessions,
Kerrstrom & Lawler
ATTORNEYS

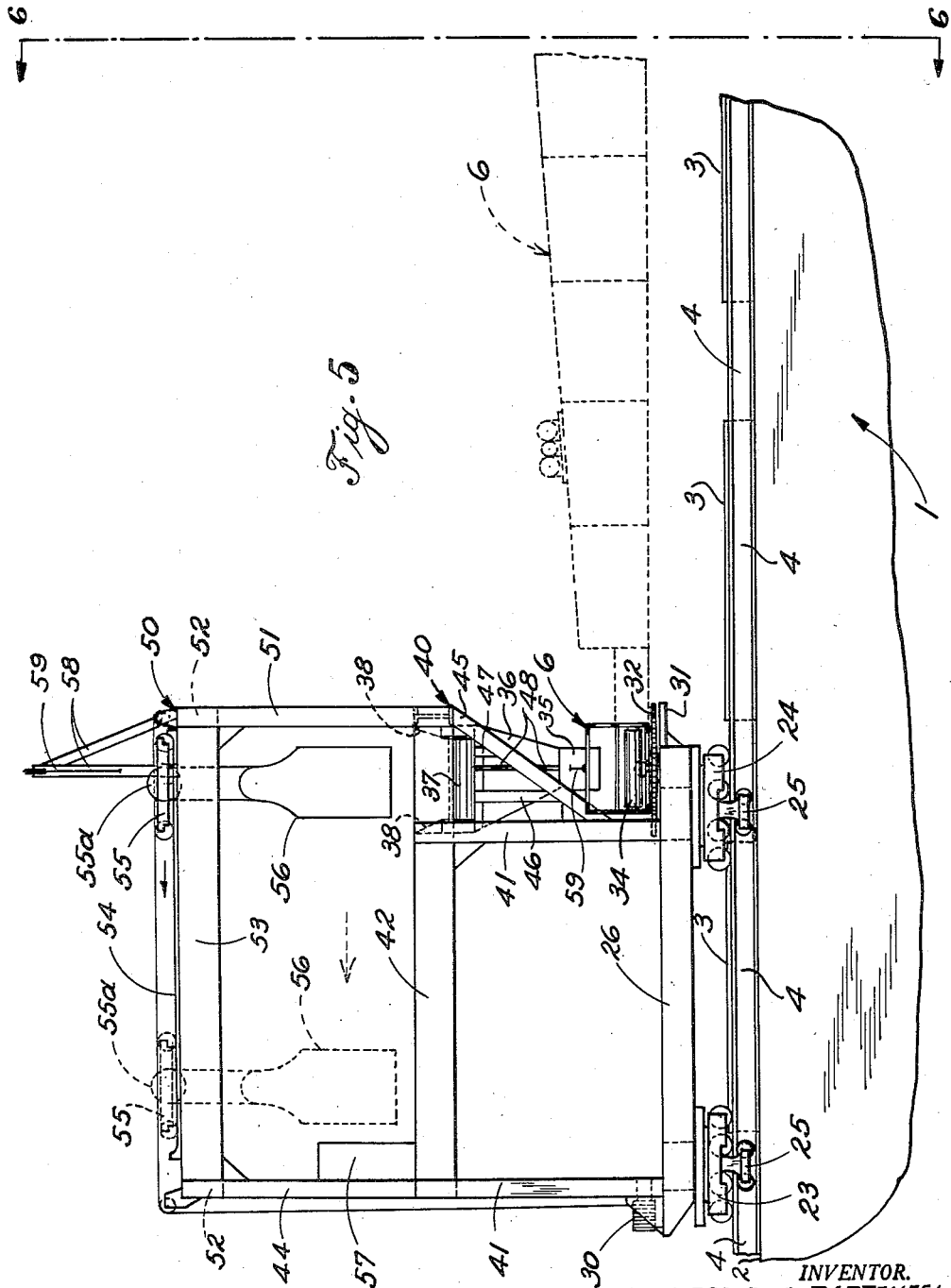

INVENTOR.
WILFORD G. BARTENFELD
ATTORNEYS

2,827,180

UNIVERSAL UNLOADING UNIT FOR BULK CARGO VESSELS

Wilford G. Bartenfeld, Lakewood, Ohio

Application December 19, 1955, Serial No. 553,849

19 Claims. (Cl. 214—15)

This invention relates to an unloading unit for a bulk cargo vessel, particularly a self-contained unit of the type adapted to travel lengthwise of the vessel into a working position immediately above the hatch through which cargo is to be unloaded.

Self contained unloading units for vessels are not new, but such units as have heretofore been known suffer from characteristic drawbacks. One of these is a lack of sufficient flexibility, an example being where the unloading boom is associated mainly with one of the two sides of the vessel and therefore is not adapted to serve the other side with any degree of facility. Thus the side with the boom tends to become the docking side in nearly all circumstances. Another drawback resides in the fact that such unloading units tend to have a rather limited capacity, requiring that the vessel be kept in port for a period longer than might be desired. Always in connection with the loading and unloading of cargo vessels it is a primary desideratum to remove and take on cargo as expeditiously as possible, this in order that the vessel may put to sea with only a minimum of delay in port.

One of the objects of the present invention is to provide a self-unloading unit of a type that permits the vessel to dock on either side, port or starboard, without awkwardness; for example, without requiring the unloading boom to be disassembled from an original position elsewhere, as on the opposite side, and reassembled on the side adjacent the dock. Another object is to increase the unloading rate, as by incorporating in a single crane a plurality of independently functioning cargo scoops adapted to operate simultaneously, through one and the same hatch, on the cargo to be removed.

Still another object of the invention is to provide an unloading unit of this type of which the crane, when the vessel is at sea, may be received in and securely lashed or otherwise fastened to a cage-like framework of a kind designed to hold it fixedly in position.

Other objects, advantages and features of the invention will be apparent from the following description and from the accompanying drawings, in which:

Figure 1 is a side elevation of a representative type of cargo vessel on which the invention may be used;

Figure 2 is a diagrammatic top plan showing on a somewhat larger scale a portion of the vessel, crane and receiving cage as seen from line 2—2 of Figure 1;

Figure 3 is a corresponding side elevation as seen from line 3—3 of Figure 2, the scale being larger than that of Figure 2;

Figure 4 is a plan on the same scale as Figure 3 showing the crane seen as if seen from line 4—4 of Figure 1 at a point some distance forward of the receiving cage; and Figures 5 and 6 are side and end elevations, respectively, showing the crane as it appears when actually being used in unloading the vessel.

Figure 6:
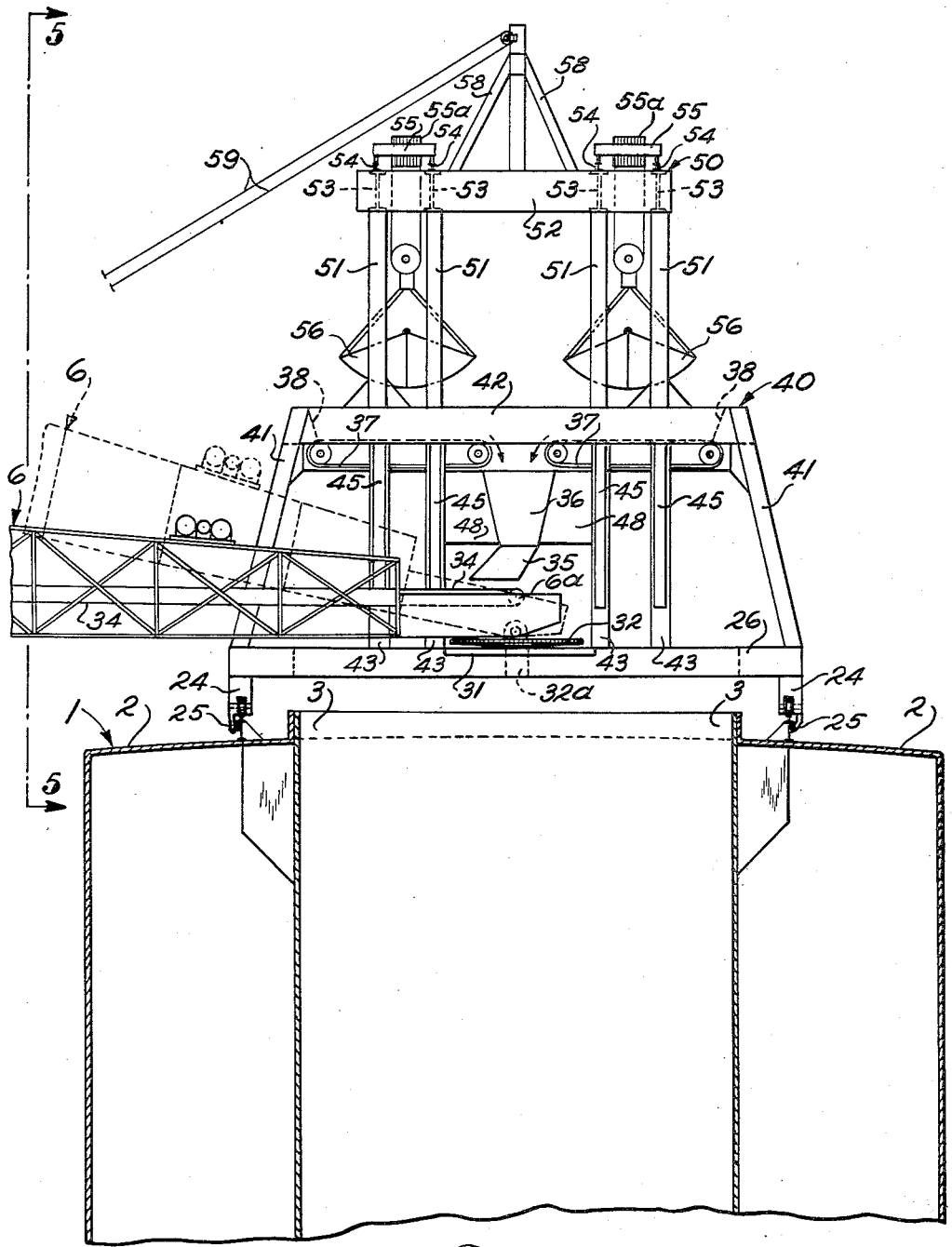

A representative type of vessel, one of many kinds on which the invention may be employed, is shown in Figure 1, in which 1 designates the vessel generally. The deck 2 is provided with a series of hatches 3, nine such hatches appear in Figure 1. Flanking this series of hatches are tracks 4, best seen in Figure 4, along which the crane 5 may travel in order to bring it into position directly above one of the hatches 3. In Figure 1, the dotted-line showing of the crane illustrates one such position, although it should be understood that when in use in unloading the vessel the crane may be forward or aft of the position represented by the dotted-line showing in Figure 1.

Crane 5 is provided with a boom 6 which may be swung laterally through an angle of 90° in either direction, left or right, in relation to the longitudinal axis of the vessel; i. e., over a total angle of approximately 180°, and which may be elevated from a horizontal position into one in which it extends at an 18° angle to the horizontal. When not needed for unloading the vessel, as when the vessel is at sea, the crane is firmly secured in a cage-like framework, hereinafter referred to as a cage, located just forward of after house 8. Cage 7 is rigidly attached to the deck 2 of the vessel. It is sturdily formed but is open at its forward end and also across the top. This permits the crane to be backed into place in the position indicated in solid lines at the left-hand end of Figure 1 and also in Figure 3, in which the sides of cage 7 are shown as overlapping the sides of after house 8. Crane 5 and cage 7 are secured together in any suitable fashion, as by ropes, chains, pins or the like.

Cage 7 may be regarded as consisting of two main side frames 10 (Figure 2) and a number of horizontally extending beams, diagonal braces, and uprights. Each of the two side frames 10 is more or less trapezoidal in shape, being made up of vertical beam 11, an inclined beam 12 and a short, horizontal connecting beam 13 (Figure 3). A cross piece 14 may extend horizontally as shown between upright beam 11 and inclined beam 12. Suitable reinforcing brackets, as 15 and 16, complete side frames 10. It will be noted from Figures 2 and 3 that the inclined beams 12 of side frames 10 are the elements of cage 7 that straddle after house 8.

Interconnecting the two side frames 10 are two horizontal beams 17 and 18. The former is at substantially the same level as the two horizontally extending beams 13; the latter, somewhat below beams 13 and 17 but above the top of after house 8. A series of five lesser diagonal beams 19, best seen in Figure 2, intervenes between horizontal beam 17 and horizontal beam 18. A group of uprights 20, of which there is one for each of the five diagonally extending beams 19, completes cage 7. All of these vertically and diagonally extending beams are rigidly fixed to and may be treated as part of the structure of the vessel. When crane 5 is in cage 7, securing means 22, which include cables and turnbuckles, are used to secure the crane to the deck.

Crane 5, which in the preferred form of the invention comprises a crane of the Gantry type, consists largely of a framework mounted on trucks provided with wheels driven by frictional engagement with electric motors (not shown). There are at the rear of the crane two double trucks 23 and at the forward end of the crane two double trucks 24. These trucks, which ride on tracks 4, are provided with locking wheels 25 arranged as shown in Figure 5. Tracks 4 consist of rails for the wheels on trucks 23 and 24 and, below them, other rails for locking wheels 25. Locking wheels 25 serve to keep trucks 23 and 24 in place, thus preventing tipping of the crane when the latter is in use.

Among other things, crane 5 includes a frame-like platform 26 of massive construction, the shape of such platform being that of a hollow rectangle. When the crane is being used for unloading the vessel, the hollow in the rectangle will be directly over one of the hatches 3. On platform 26 on the port side of the vessel is a mounting base 27 for a diesel generator 27a; on the starboard side, this is balanced by a mounting platform 28 for a bulldozer 28a. The latter is used toward the end of the unloading operation in the hold itself. At the rear of platform 26 are two mounting bases 29 each of which accommodates three operating units 30 consisting of an electric motor, a gear reduction unit, and a winding drum.

Operating units 30 control the scoops and other equipment used for scooping up and removing the cargo from the hold. In the preferred forms of the invention, these scoops take the form of buckets of the clam shell type. In the embodiment of the invention illustrated in Figures 5 and 6 of the drawings, there are two such clam shell buckets: for each of them, three operating units 30 are required in order to accomplish raising and lowering, travel forward and aft, and opening and closing of the buckets. The manner in which the buckets are connected to operating units 30 is conventional and need not be described in detail.

At the forward end of crane 5 is a forwardly projecting platform 31 above which is a bull gear 32 adapted to rotate about a vertical axis (Figure 6). Center pin 32a is approximately midway between the sides of the crane. It carries bull gear 32, by which boom 6 may be rotated over an arc up to about 180°. Bull gear 32 is itself rotated by a pinion 33 on a shaft that extends downward through platform 26 to an electric motor and gear reduction unit (not shown) mounted within the platform base, thus making it possible to provide the desired degree of rotation of bull gear 32 and the boom 6 up to the indicated maximum of about 180°.

As indicated in dotted lines in Figure 6, boom 6 is so constructed that it may be elevated by about 18°, this being possible by virtue of the construction at the inboard end 6a of the boom. The inboard end of the boom is of course disposed over bull gear 32 and center pin 32a. As indicated in Figure 6, boom 6 is provided with conventional hoisting drums and a motor by which the boom may be elevated or, after having been elevated, may be returned to horizontal position. As indicated in Figures 4 and 6, boom 6 incorporates a belt conveyor 34 that is used for the purpose of conveying bulk cargo such as grain, ore or the like to a stockpile on the dock adjoining the vessel. The construction and manner of operation of conveyor 34 are largely conventional.

In juxtaposition to the inboard end 6a of boom 6 is a hand-rotatable sleeve 35 that is mounted for swiveling movement on the lower end of a hopper 36. The latter is located directly above the longitudinal axis of the vessel. Into the top of hopper 36 is fed and out of the lower end of sleeve 35 is discharged grain, ore or the like that is scooped up from the hold. In a simple system employing only a single scoop (in such case one capable of traveling back and forth along the longitudinal axis of the vessel) more elaborate equipment would be unnecessary, for in such case the scoop could discharge directly into hopper 36; however, in the more elaborate form of the invention shown in the drawings, two scoops are employed, each susceptible of independent movement. With such an arrangement, it is desirable to provide two opposed apron feeders 37, one for each scoop, which can discharge the grain, ore or the like into hopper 36. Above them may be a skirt 38 for directing the material discharged by the scoops onto the apron feeders 37.

To support hopper 36, apron feeders 37 and the various other parts in proper relation to inboard end 6a of boom 6, the crane includes a primary framework 40 consisting of four inclined pillars 41 provided at their upper ends with four cross pieces 42 arranged after the fashion of a hollow rectangle. Between the two pillars 41 at the forward end of the crane are four vertically extending uprights 43: see Figures 4 and 6. Similarly, between the two pillars 41 at the rear of the crane are four uprights 44. The latter extend upward above cross pieces 42 for reasons which will appear hereinafter. The rectangular frame that is formed by cross pieces 42 projects forward of pillars 41 and uprights 43, this being most clearly apparent from Figures 3 and 5.

To support the overhanging portion of the frame so formed, four diagonal braces 45 extend rearwardly beneath apron feeders 37 as shown in Figures 3 and 5. The lower ends of diagonal braces 45 bear against uprights 43: see Figure 6. Extending upward from diagonal braces 45 to the structure supporting apron feeders 37 are lesser uprights 46 and 47; see Figure 5. Extending transversely to the longitudinal axis of the vessel between uprights 46 and 47 are stiffening brackets 48 for hopper 36. Brackets 48 are trapezoidal in shape. They are attached to the sides of hopper 36 and, above the hopper, to the structure supporting apron feeders 37. Brackets 48 appear in end elevation in Figure 5 and in front elevation in Figure 6.

A secondary framework 50 is carried as a superstructure on primary framework 40. Secondary framework 50 incorporates the upper portions of uprights 44, of which there are four, and four correspondingly located uprights 51 at the front end of the crane. The latter are best seen in Figure 6. The four uprights 44 on one hand and the four uprights 51 on the other are connected at their upper ends by two cross pieces 52 that extend transversely of the longitudinal axis of the vessel. Completing the secondary framework 50 are four horizontally extending beams 53. The four beams 53 are located as indicated in Figure 6; i. e., at one end on the tops of the four uprights 51 and, at the other end, on the tops of the four uprights 44. Thus a sturdy secondary framework 50 is provided above the level of primary framework 40, such secondary framework 50 serving in the main as means for carrying the two cargo scoops.

Above each of the four beams 53 is a rail 54, there being two such rails on each side of the longitudinal center line of secondary framework 50. Each pair of rails accommodates an overhead trolley 55 provided with a hoisting drum 55a. Scoops 56 are connected in the usual way to drums 55a. The operation of each of the scoops is controlled by an attendant stationed in a cab 57, there being two such cabs arranged as indicated in Figures 2 and 5. Inasmuch as the scoops are operated independently of each other, they may or may not, at a given time, be aligned with each other transversely of the vessel as represented in Figures 5 and 6.

Mounted on secondary framework 50 is an A-frame 58 for the cables 59 which run from the top of the crane to the outboard end of boom 6; see Figure 3.

In operation, the crane is moved along tracks 4 to a position over the part of the hold to be emptied, this being represented by the dotted line showing in Figure 1. Boom 6 is then swung laterally as required by the location of the dock, clockwise or counterclockwise, after which it may be raised into its elevated position, if desired. Thereupon, the attendants in cabs 57 cause scoops 56 to be moved rearwardly into positions corresponding to the dotted line position in Figure 5, after which the scoops are dropped into the hold into the cargo to be unloaded.

When the scoop is to be removed, the operator elevates it from the hold to the dotted line position shown in Figure 5. Then, by movement of the trolley, he causes it to move to the full line position shown at the forward end of the crane as shown in Figure 5. In this position, the scoop is opened. Its contents are discharged into skirt 38 and thence onto one of the two apron feeders 37, conveyed thence to the common discharge zone overlying hopper 36, and caused to drop by gravity onto belt conveyor 34 at the inboard end 6a of boom 6.

These operations are repeated as necessary, after which the crane is moved to a new position over a different hatch. When the ship has been completely unloaded, which is accomplished with the aid of bulldozer 28a, the scoops are made fast by chains or otherwise to secondary framework 50. Boom 6 is then retracted until its outboard end overlies the longitudinal axis of the vessel, this being the dotted-line position of the boom in Figure 5. Thereafter the crane is backed along tracks 4 into receiving cage 7, to which it is secured as previously described. This having been done, the outboard end of the boom is made fast to the deck of the vessel. The vessel is then ready to proceed to a loading dock to take on a fresh cargo.

Of considerable advantage is the fact that the two scoops may, if desired, be operated simultaneously. This is possible in consequence of the fact that the tracks, trolleys and hoists utilized in moving the scoops from place to place run or operate in a direction paralleling the longitudinal axis of the vessel. The central location of the inboard end of the boom also has important advantages, permitting the boom to be traversed through a total angle of about 180°. Since the boom is so located that it may, if desired, parallel the longitudinal axis of the vessel when the vessel is at sea, it follows that the boom may be cause to project from either side of the vessel, port or starboard, thus adding greatly to the flexibility of the operations and making it possible to bring either side of the vessel into proximity to the loading dock.

Furthermore, the invention eliminates many of the undesirable features of self-unloading vessels of the types known and used at the present time. Unlike the latter, it leaves the cargo hold clean and unobstructed, permits of the handling of any kind of bulk cargo that can be handled by clam shell buckets, and provides desirably fast cargo-discharge rates. Whereas dock equipment cannot be employed to unload self-unloading vessels of the kinds now used, such equipment may, where needed or desired, be used to unload vessels constructed in accordance with the present invention. This follows in consequence of the mobility of the hereinabove-described self-unloading unit. In a vessel constructed in accordance with the present invention, the latter can be built and erected aboard ship at a reasonable cost, usually about one-third of the cost of the equipment required in self-unloading vessels of the kind now used.

It is apparent that, within the purview of the invention, changes are likely to suggest themselves to those skilled in the art. Thus, if desired, one may simplify the described arrangement by using a single centrally disposed scoop, omitting the apron feeders; conversely, one may, if desired, increase the number of tracks, trolleys and scoops (particularly in a wider vessel) so as to permit of the employment of more than two scoops in parallel at one and the same time. The hopper means illustrated in the drawings may be elaborated or simplified, depending on circumstances; under some circumstances, they may be replaced by slides, chutes or the like. Changes may also be made in the design and location of the crane receiving cage, as well as in the manner of holding the crane in place in it.

It is intended that the patent shall cover, by summarization in appended claims, all features of patentable novelty residing in the invention.

What is claimed is:

1. In a cargo vessel, a self-unloading unit comprising a framework adapted to fit over a hatch in the deck of the vessel; means by which the framework may be moved in a direction paralleling the longitudinal axis of the vessel; a boom extending outwardly from one end of the framework, said boom incorporating means for moving cargo from the inboard end to the outboard end of the boom; means associated with the framework for pivotally supporting the inboard end of the boom, said supporting means being disposed substantially midway between the sides of the framework; a plurality of conveyors extending inwardly from the sides of the framework to a common discharge zone above the level of said supporting means; and a plurality of cargo scoops each of which is susceptible of movement in a direction paralleling the longitudinal axis of the vessel into and out of positions over said conveyors.

2. A self-unloading unit as in claim 1 in which the upper reaches of the conveyors move toward each other substantially at right angles to the longitudinal axis of the vessel.

3. A self-unloading unit as in claim 2 in which the conveyors take the form of apron feeders.

4. In a cargo vessel, a self-unloading unit comprising a framework adapted to fit over a hatch in the deck of the vessel; means by which the framework may be moved in a direction paralleling the longitudinal axis of the vessel; a boom extending outwardly from one end of the framework, said boom incorporating a conveyor for moving cargo from the inboard end to the outboard end of the boom; means associated with the framework for pivotally supporting the inboard end of the boom, said supporting means being disposed substantially midway between the sides of the framework; a hopper over the inboard end of the boom; a plurality of conveyors extending inwardly from the sides of the framework to a discharge zone above the level of said hopper means; and, supported from the framework, a plurality of cargo scoops each of which is susceptible of movement in a direction paralleling the longitudinal axis of the vessel into and out of a position over one of said last-mentioned conveyors.

5. A self-unloading unit as in claim 4 in which the scoops take the form of cable-controlled buckets.

6. A self-unloading unit as in claim 5 in which the buckets are of the clam-shell type.

7. In a cargo vessel, a self-unloading unit comprising a framework including an open frame-like base adapted to fit over an opening in the deck of the vessel, the sides of said framework paralleling the longitudinal axis of the vessel; means by which the framework may be moved in a direction paralleling the longitudinal axis of the vessel; a boom extending outwardly from one end of the framework, said boom incorporating a conveyor for moving cargo from the inboard end to the outboard end of the boom; means associated with and mounted on the base of the framework for supporting the inboard end of the boom for swinging movement about a vertical axis, said supporting means being disposed over the longitudinal axis of the vessel substantially midway between the sides of the base in a position allowing approximately 180° of horizontal traverse; a hopper over the inboard end of the boom; means for directing the cargo to the hopper; a plurality of ways on the framework paralleling the longitudinal axis of the vessel; and, disposed over the opening in the base, a plurality of cargo scoops adapted to travel back and forth on said ways into and out of discharge positions above the level of said directing means.

8. A self-unloading unit as in claim 7 in which the ways on the framework straddle the hopper.

9. A self-unloading unit as in claim 8 in which there are two pairs of ways, one pair on one side of the hopper and one pair on the opposite side of the hopper.

10. In a cargo vessel, a self-unloading unit comprising a moveable framework adapted to fit over a hatch in the deck of the vessel; a plurality of cargo scoops supported from the framework each of which is moveable in a direction paralleling the longitudinal axis of the vessel; a plurality of conveyors within the framework, each of said conveyors extending from a zone near the periphery of the framework to a common discharge zone approximately midway between the sides of the framework; hopper means beneath the conveyors in said common discharge zone; a boom incorporating a conveyor adapted to convey cargo that has been discharged from said hopper means from the inboard end to the outboard end of the boom; and means for pivotally mounting the inboard end of the boom on the base of the unit, said mounting means being located over the longitudinal axis of the vessel.

11. A self-unloading unit as in claim 10 in which the boom is pivoted for arcuate movement in a horizontal plane.

12. A self-unloading unit as in claim 11 in which the outboard end of the boom can be raised above the level of the mounting means at the inboard end of the boom.

13. In a cargo vessel, a self-unloading unit comprising a moveable framework adapted to fit over a hatch in the deck of the vessel; a plurality of cargo scoops supported from the framework each of which is moveable in a direction paralleling the longitudinal axis of the vessel; a plurality of conveyors within the framework, each of said conveyors extending from a zone near the periphery of the framework to a common discharge zone approximately midway between the sides of the framework; hopper means beneath the conveyors in said common discharge zone; a boom incorporating a conveyor adapted to convey cargo that has been discharged from said hopper means from the inboard end to the outboard end of the boom; and means at the sides of the framework for securing the framework to the vessel.

14. A self-unloading unit as in claim 13 in which the securing means are comprised of fastening elements that extend from the base of the framework to the deck of the vessel.

15. A self-unloading unit as in claim 13 in which the securing means take the form of a cage on the deck of the vessel in which the near end of the framework is received.

16. A cargo vessel comprising a hull having a deck extending from end to end thereof; a plurality of hatches in said deck; a receiving cage of open construction between one end of the vessel and the nearest hatch; and, in alignment with said receiving cage, a framework adapted to fit over said hatches, said framework incorporating a plurality of cargo scoops that are moveable in a direction paralleling the longitudinal axis of the vessel, a plurality of conveyors extending from the sides of the framework to a common discharge zone approximately midway between the sides of the framework, and, below the level of said discharge zone, a boom adapted to convey cargo from the inboard end to the outboard end of the boom.

17. A cargo vessel unloading unit comprising a framework including an open frame-like base adapted to extend across an opening in the deck of the vessel with its sides paralleling the longitudinal axis of the vessel; means by which the framework may be moved in a direction paralleling the longitudinal axis of the vessel; a boom extending outwardly from one end of the framework, said boom incorporating a conveyor for moving cargo from the inboard to the outboard end of the boom; means associated with and mounted on the base of the framework for supporting the inboard end of the boom for swinging movement about a vertical axis, said supporting means being disposed substantially midway between the sides of the base over the longitudinal axis of the vessel in a position allowing approximately 180° of horizontal traverse; at least one conveyor extending toward and discharging over the inboard end of the boom; and, suspended within the framework, a plurality of trolley-supported cargo scoops each of which is susceptible of being raised and lowered through the opening in the base of the framework.

18. A cargo vessel unloading unit comprising a framework including an open frame-like base adapted to extend across an opening in the deck of the vessel with its sides paralleling the longitudinal axis of the vessel; means by which the framework may be moved in a direction paralleling the longitudinal axis of the vessel; a boom extending outwardly from one end of the framework, said boom incorporating a conveyor for moving cargo from the inboard to the outboard end of the boom; means associated with and mounted on the base of the framework for supporting the inboard end of the boom for swinging movement about a vertical axis, said supporting means being disposed substantially midway between the sides of the base over the longitudinal axis of the vessel in a position allowing approximately 180° of horizontal traverse; hopper means over the inboard end of the boom; at least one conveyor extending toward and discharging over said hopper means; and, suspended within the framework, a plurality of trolley-supported cargo scoops each of which is susceptible of being raised and lowered through the opening in the base of the framework.

19. A cargo vessel unloading unit comprising a moveable framework including an open frame-like base adapted to extend across an opening in the deck of the vessel with its sides paralleling the longitudinal axis of the vessel; a plurality of cargo scoops supported from the framework over the opening in the base each of which scoops is moveable independently of the others; a plurality of conveyors within the framework, said conveyors extending in opposite directions; hopper means disposed beneath the ends of the conveyors; and a boom incorporating a conveyor adapted to convey from the inboard to the outboard end of the boom any cargo that is discharged onto said conveyor from said hopper means, said boom having its inboard end mounted on the base for swinging movement through an angle of approximately 180° about a vertical axis substantially midway between the sides of the base over the longitudinal axis of the vessel.

References Cited in the file of this patent

UNITED STATES PATENTS

| | | |
|---|---|---|
| 602,888 | Walsh | Apr. 26, 1898 |
| 1,089,496 | Read | Mar. 10, 1914 |
| 1,565,875 | Von Haase | Dec. 15, 1925 |
| 1,580,556 | Enard | Apr. 13, 1926 |
| 2,660,319 | Dorland | Nov. 24, 1953 |